United States Patent [19]

Beelitz et al.

[11] 4,444,659

[45] Apr. 24, 1984

[54] MAGNETIC SEPARATOR WITH DIRECT WASHING

[76] Inventors: Günther Beelitz, Christian-Rötzel-Allee 11; Siegfried Andre, Josefstrasse 71, both of D-4054 Nettetal 1, Fed. Rep. of Germany

[21] Appl. No.: 414,856

[22] Filed: Sep. 3, 1982

[30] Foreign Application Priority Data

Sep. 3, 1981 [DE] Fed. Rep. of Germany ....... 3134861

[51] Int. Cl.$^3$ .............................................. B01D 35/06

[52] U.S. Cl. .................................... 210/222; 204/302; 210/695

[58] Field of Search ............... 210/222, 223, 411, 695; 204/302; 209/215, 216

[56] References Cited

FOREIGN PATENT DOCUMENTS 1930174 2/1970 Fed. Rep. of Germany .
2108015 9/1972 Fed. Rep. of Germany .
1944628 10/1972 Fed. Rep. of Germany .

*Primary Examiner*—Frank Sever
*Attorney, Agent, or Firm*—Young & Thompson

[57] ABSTRACT

A magnetic separator for the separation of ferromagnetic solid particles and nonmagnetic particles from a liquid medium comprises a cylindrical separation chamber (1*a*) with an inlet opening (2) and an outlet opening (3), as well as a dirt chamber (1*b*) with a drain (4). A cylindrical pipe (5) extends through the separation chamber (1*a*) and the dirt chamber (1*b*). In this pipe, a magnetic rod (6, 6*a*) is movable from its normal operating position into a washing position, and vice versa. By displacement of the magnetic rod (6, 6*a*) into the washing position, the separated solid particles are transported into the dirt chamber (1*b*) and are flushed out therefrom by a partial stream of the medium undergoing treatment. During the washing step, a sufficiently large section (6) of the magnetic rod (7, 6*a*) is still in the separation chamber (1*a*) at all times, and so there is no interruption of the separation operation during washing.

8 Claims, 2 Drawing Figures

MAGNETIC SEPARATOR WITH DIRECT WASHING

The invention relates to a separator for liquid media in open, unpressurized or pressurized, closed systems, wherein ferromagnetic solid particles, and nonmagnetic particles which may be interlocked therewith, are separated with the aid of magnets, which separator can be regularly washed without an interruption in the separation process.

Magnetic separators constitute a well-known and widely popular means for the separation of ferromagnetic abraded fines, mixtures of ferromagnetic particles and nonmagnetic metallic, ceramic, textile or other solid particles interlocked with the ferromagnetic particles, from oil circulation systems, emulsions or water.

Heretofore conventional magnetic separators of this kind have lent themselves to backwashing or rinse-through either not at all, when using permanent magnets, or only with difficulty, especially in the case of electromagnets on account of remanence. In other words, they cannot be cleaned at intervals, of the separated solid particles of the afore-described type, without an interruption in the separation process. In the most frequently employed permanent magnet separators, magnetic rods are used which, for cleaning purposes, must be dismantled from the system and freed of the separated solid particles by manual stripping. In the case of large magnetic separators, the rods are cleaned by mechanically-driven stripping systems. Great wear and tear is encountered on the rods as well as the stripping means in such magnetic separators, if the solid particles to the separated are crystalline and of great hardness.

Furthermore, permanent magnet separators exist wherein manual cleaning by spraying, blowing or stripping operations is simplified by housing the actual magnet rods in shells or casings, which can be separated from the magnets after dismantling from the separator. However, this takes place mostly outside of the separator and, in all cases, with the separation operation being interrupted.

It is accordingly an object of this invention to eliminate these disadvantages which heretofore have made difficult, or even prevented, the use of magnetic separators as low-maintenance units, particularly in liquid media to be separated which contain abrasive contaminants.

Another object of the invention is to obtain uninterrupted magnetic separation with a regular discharge of separated solid particles.

Finally, it is an object of this invention to provide a magnetic separator for liquid media, which permits continuous filtering with a regular discharge of the separated solid particles by direct washing with a relatively small washing volume.

The invention will be explained in greater detail below with reference to an embodiment schematically shown in the drawings in a longitudinal sectional view wherein.

Figure 1:
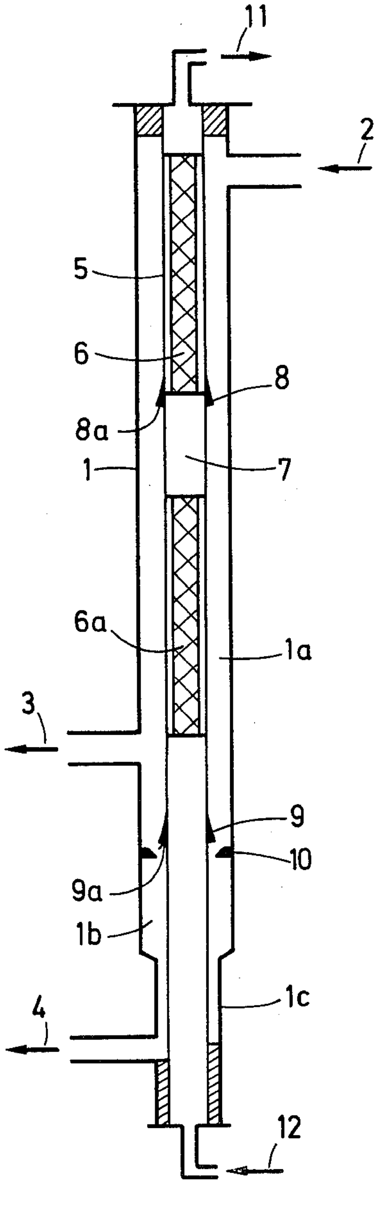
FIG. 1 shows the normal operating position.

The flow-through separator for liquid media, according to the present invention, comprises a vertical outer pipe 1 forming a separation chamber 1*a* with an inlet opening 2 and an outlet opening 3, as well as a dirt chamber 1*b* with a discharge drain 4. A cylindrical pipe

5 having a small wall thickness and made of a nonmagnetic material is centrally arranged in the outer pipe 1; this cylindrical pipe extends through the separation chamber 1*a* and the dirt chamber 1*b*. A magnetic double rod consisting of two individual magnetic rods 6, 6*a* is housed in the cylindrical pipe 5. The individual rods are firmly joined together by means of spacer elements 7 and are displaceable within the cylindrical pipe 5 by means of piston rings.

Conical stopper rings 8 and 9 each with an outer cone flared in the direction toward the dirt chamber 1*b* and in the flow direction of the medium are fixedly arranged on the cylindrical pipe 5 in the zone of the separation chamber 1*a* and the dirt chamber 1*b*, respectively. Another stopper ring 10 is disposed on the inside of the outer pipe 1 below the outlet opening 3 of the separation chamber 1*a*. This ring 10 has an inner cone oriented in opposition to the stopper ring 9 and forms a greatly constricted circular-ring cross section with the stopper ring 9. The stopper rings 9 and 10 delimit the upper end of the dirt chamber 1*b*, the cylindrical wall portion 1*c* of which tapers abruptly in the zone immediately upstream of the outlet 4. The circular-ring cross section of the narrowed portion of the dirt chamber 1*b* is no smaller than the free cross section of the dirt chamber drain 4.

The mode of operation of the magnetic separator is as follows:

In the normal operating position of the separator according to FIG. 1, the ferromagnetic solid particles, and the nonmagnetic particles which may be interlocked therewith, which are attracted by the magnetic rods 6, 6*a*, settle out of the liquid medium flowing through the separation chamber 1*a* onto the outer wall of the cylindrical pipe 5. To wash the separator, the pressure connection 11 is connected with compressed air so that the double rod is displaced into the washing position according to FIG. 2 wherein the upper rod 6 assumes the normal operating position of the lower rod 6*a* in the separation chamber 1*a*, and the lower rod 6*a* is located in the dirt chamber 1*b*. During the shifting of the double rod into the washing position, the solid particles that have settled on the outer wall of the cylindrical pipe 5 are displaced downwardly along the cylindrical pipe 5 toward the dirt chamber 1*b* by the moving magnetic field of the rods 6, 6*a*, in some cases with the concomitant action of the flow of the medium to be treated. During this step, the solid particles pass the stopper rings 8 and 9.

In the washing position of the separator, the solid particles caught by the upper rod 6, after passing the stopper ring 8, are disposed on the cylindrical pipe 5 in the separation chamber 1*a* in the region of the same rod; and the particles caught by the lower rod 6*a* in the normal operating position of the separator are again retained by the rod 6*a* on the cylindrical pipe 5, although only in part in the lower portion of the dirt chamber 1*b* due to the higher flow velocity in the region of the constricted circular-ring cross section formed by the stopper rings 9 and 10, while the other portion of the solid particles is flushed out, by a partial stream of the medium to be separated, through the drain 4 of the dirt chamber 1*b*.

Figure 2:
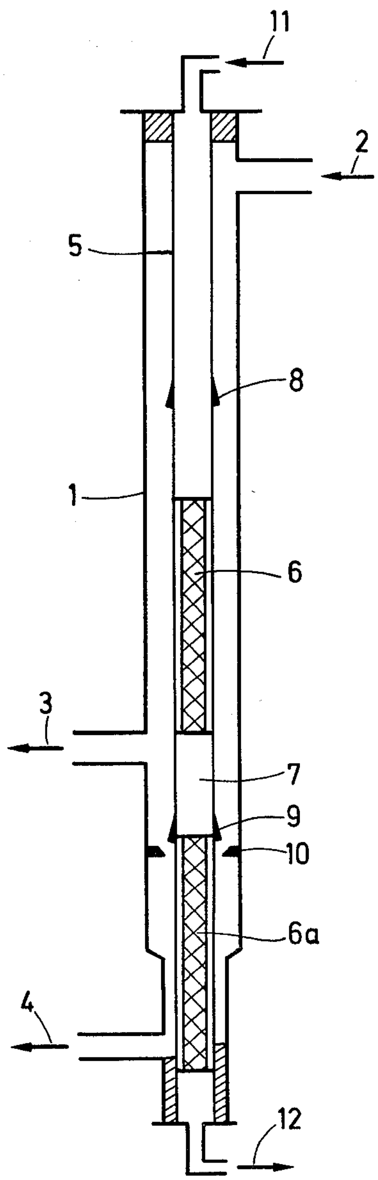
FIG. 2 shows the washing position of the separator.

To change the separator over from the washing position of FIG. 2 into the normal operating position according to FIG. 1, the pressure coupling 12 is supplied with compressed air so that the double rod is pushed upwardly within the cylindrical pipe into the normal operating position. The separated solid particles are retained in the dirt chamber 1c by the stripping effect of the stopper ring 9 with the base 9a extending at a right angle to the cylindrical pipe 5 and by the partial stream of medium to be separated entering between the stopper rings 9, 10 into the dirt chamber 1b.

As soon as the double rod has reached the operating position according to FIG. 1, the dirt chamber 1b is again fully demagnetized, and the separated solid particles are flushed out through the drain 4 by the partial stream of medium traversing the dirt chamber 1b. During the upward movement of the double rod into the operating position, the solid particles entrained by the upper rod 6 on the outer wall of the cylindrical pipe 5 in the separation chamber 1a are retained by the base 8a of the stopper ring 8 and held back, in the operating position of the double rod, by the magnetic field of the lower rod 6a on the cylindrical pipe 5, which rod 6a conveys these particles, during the next washing step, along the cylindrical pipe 5 and into the dirt chamber 1b.

What is claimed is:

1. A magnetic separator for the separation of ferromagnetic solid particles, and nonmagnetic particles which may be interlocked therewith, from liquid media, comprising a casing which encloses a separation chamber traversed by the medium and having an inlet opening for the medium to be separated and an outlet opening for separated medium, and at least one magnetic member arranged in the separation chamber and surrounded by means for isolating said particles at all times from said magnetic member including an elongated stationary nonmagnetic shell, there being a dirt chamber (1b) following the separation chamber (1a) in the direction of flow of the liquid media, the dirt chamber having a drain (4) for separated dirt, said shell (5) extending into the dirt chamber (1b) and means to move the magnetic member (6, 6a) lengthwise within and relative to the shell (5) from an operating position in the separation chamber (1a) into a washing position and vice versa, said magnetic member (6, 6a) being partially in the separation chamber (1a) and partially in the dirt chamber (1b) in said washing position, and at least one blocking means (9) on the shell (5) and encompassing the shell, said blocking means passable by solid particles moving along the shell (5) in the direction of the dirt chamber (1b) during an advancing movement of the magnetic member (6, 6a) into the washing position, and the solid particles being retained by said blocking means (9) during the reverse movement of the magnetic member (6, 6a) into the operating position.

2. Magnetic separator according to claim 1, in which the magnetic member consists of two permanent magnet rods (6 and 6a) fixedly joined together by a nonmagnetic spacer element (7).

3. Magnetic separator according to claim 1, in which a thin-walled cylindrical pipe (5) of a nonmagnetic material serves as said shell for the magnetic member (6, 6a).

4. Magnetic separator according to claim 1, in which the magnetic member (6, 6a) is a piston with piston rings, reciprocable in the cylindrical pipe (5) by means of a pressure medium.

5. Magnetic separator according to claim 1, in which the blocking means are conical stopper rings (8 and 9), the smallest diameter of which corresponds to the outer diameter of the cylindrical pipe (5), said stopper rings being attached to the cylindrical pipe (5) with an outer conical surface flaring toward the dirt chamber (1b).

6. Magnetic separator according to claim 1, in which the blocking means are conical stopper rings (8 and 9), the smallest diameter of which corresponds to the outer diameter of the cylindrical pipe (5), said stopper rings being attached to the cylindrical pipe (5) with an outer conical surface flaring in the flow direction of said medium.

7. Magnetic separator according to claim 1, and a stopper ring (9) on the shell between the separation chamber (1a) and the dirt chamber (1b), the stopper ring (9) having a conical surface, another stopper ring (10) on the inside of the casing (1) and having conical surface in opposition to the stopper ring (9), the stopper rings (9 and 10) forming a circular-ring cross section greatly narrowed with respect to the separation chamber.

8. Magnetic separator according to claim 1, in which the outer wall (1c) of the lower portion of the dirt chamber (1b) is constricted to form an additionally narrowed circular-ring cross section, which is no smaller than the free cross section of the dirt drain (4).

* * * * *